Nov. 22, 1938.  H. KATTWINKEL  2,137,977
LAMINATED DISK CLUTCH
Filed May 19, 1937   3 Sheets-Sheet 1

Fig.1ª

Inventor:
H. Kattwinkel
By Glascock Downing & Seebold

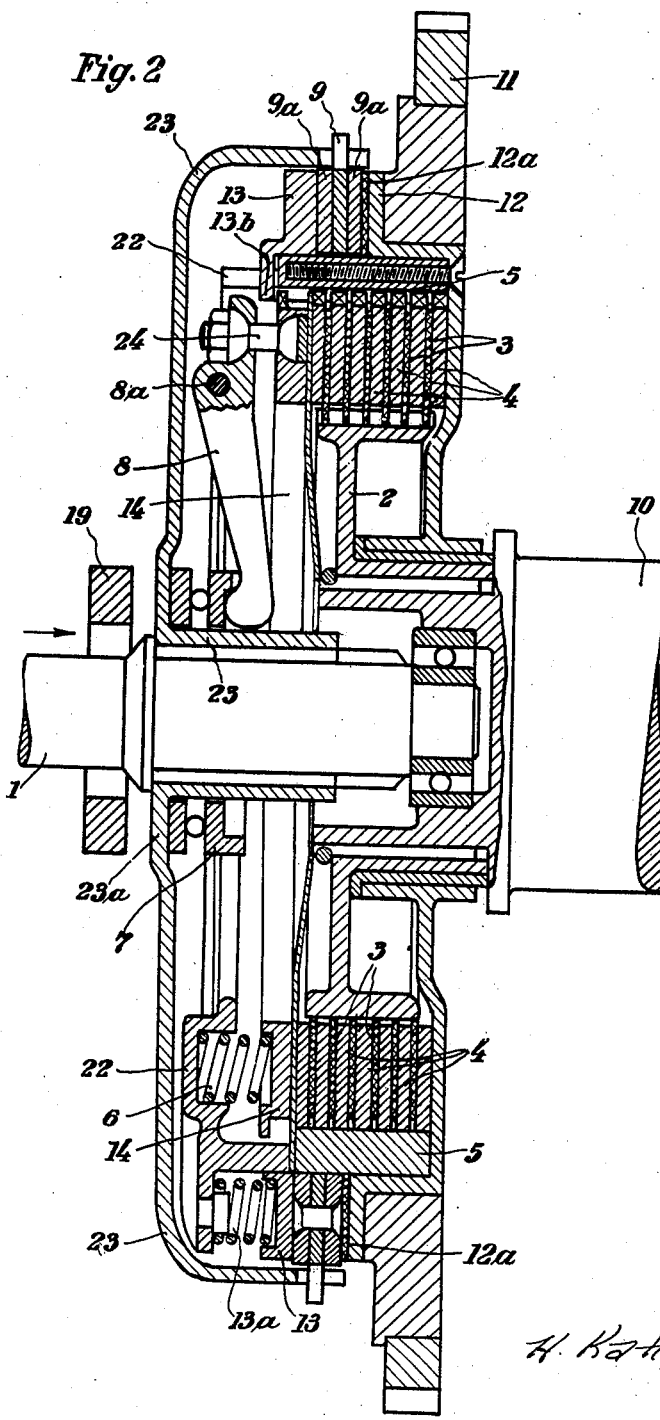

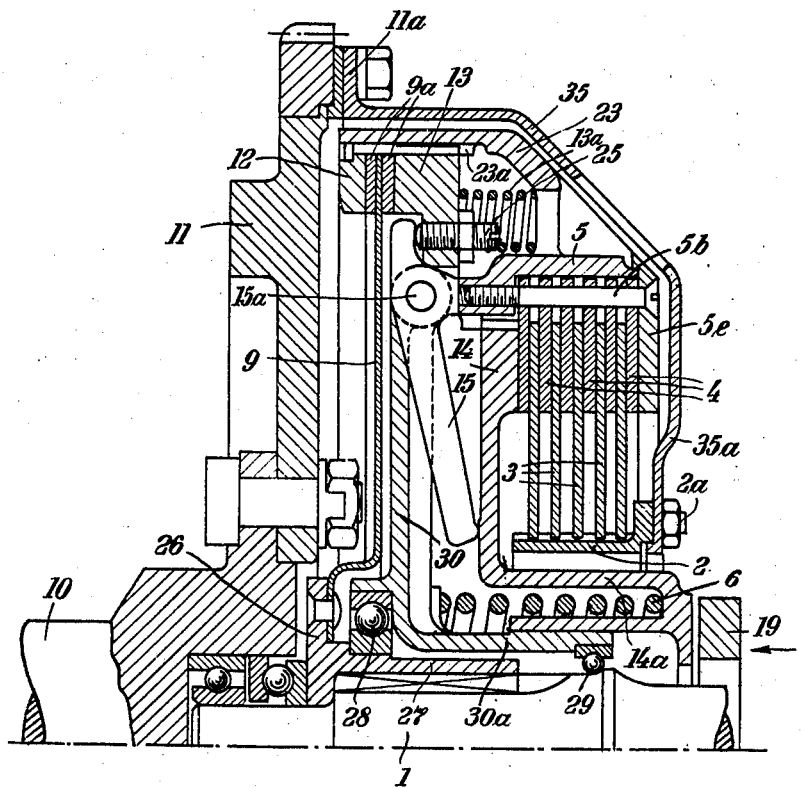

Patented Nov. 22, 1938

2,137,977

UNITED STATES PATENT OFFICE 2,137,977

LAMINATED DISK CLUTCH

Hans Kattwinkel, Radebeul, Germany

Application May 19, 1937, Serial No. 143,582
In Germany May 22, 1936

21 Claims. (Cl. 192—48)

My invention relates to a multiple disk friction clutch, primarily intended to be interposed between the driving engine and the change-speed gear of an automobile vehicle, comprising two clutch disk-carriers, one pertaining to the driving shaft and the other to the driven shaft, one of the said clutch disk-carriers being permanently connected non-rotatably with its associated shaft. According to the invention the other clutch disk-carrier is rotatable both in relation to the shaft pertaining to it and also in relation to the shaft pertaining to the first-named clutch-disk-carrier, and is brought into and out of engagement with its associated shaft by an auxiliary clutch, preferably constructed as a single-disk friction clutch, when the main clutch is closed and opened.

This novel clutch is distinguished by the following advantages amongst others: It only takes up a small amount of space, particularly in an axial direction; it permits of smooth starting at all times; the frictional conditions are constant; the friction coverings are of great durability; the consumption of power in operating the clutch pedal is small on account of the possibility, occasioned by the close contact of the clutch disks, of selecting a high ratio of transmission; the clutch is cheap to manufacture, and simple to install. Further advantages and features of the invention will be gathered from the following description.

Figure 1:
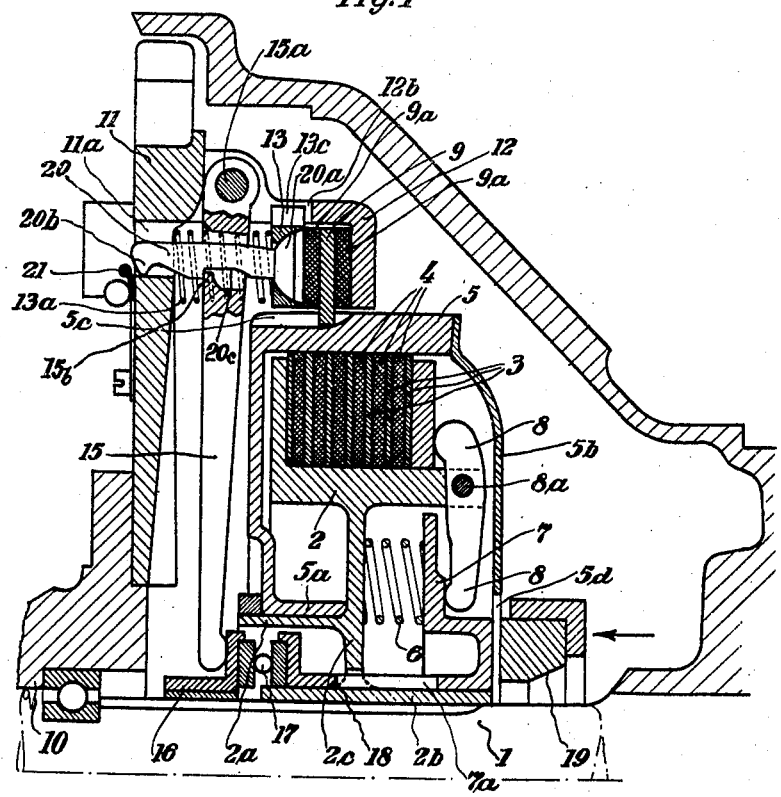
Figure 1:
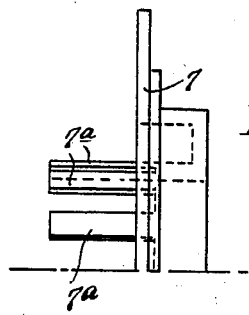

Various preferred forms of construction of the invention are illustrated by way of example in the accompanying drawings, in which Figure 1 shows in axial sectional elevation the upper half of a vehicle clutch constructed according to the invention, while Figure 1a is a detail view of pressure plate 7, and Figures 2 and 3 are axial sections through two further embodiments of the invention.

In Figure 1, I denotes the gear shaft, upon which a carrier 2 for the inner frictional clutch disks 3 is keyed fast. A carrier 5 for the outer clutch disks 4 is rotatably supported by its hub sleeve 5a upon a hollow cylindrical extension 2a of the carrier 2. By a cover 5b connected with the free end of the carrier 5, the cavity containing the clutch disks 3, 4 is shut off, except for a central aperture 5d, so that the interior can be filled with oil or some other lubricating or cooling medium. The compression of the clutch disks 3, 4, which are in engagement with one another even when the clutch is released, is effected by the aid of a plurality of helical springs 6, which bear at one end against the carrier 2 for the inner disks and at the other end against a pressure ring 7, which is so supported upon the tubular hub 2b of the carrier 2 as to be axially slidable but not rotatable thereon. By means of levers 8 mounted at 8a on the carrier 2, the pressure of the springs 6 is transmitted to the clutch disks. The carrier 5 for the outer clutch disks is provided at 5c with teeth, which mesh with corresponding internal teeth on a sheet steel ring 9, which is provided on both sides with friction coatings 9a. The friction ring together with an annular body 12, which is connected fast with a flywheel 11 mounted upon the engine shaft, forms an auxiliary clutch, to which there also pertains a pressure ring 13, which is pressed towards the right against the friction ring 9 by helical springs 13a, a radial flange on the ring 12 constituting the abutment. The retraction of the pressure ring 13, which is guided by projections 13c engaging in recesses 12b in the annular body 12, is effected through the medium of levers 15, which are pivoted at 15a on the flywheel 11, and bear with their inner ends against a sleeve 16, which is rotatable relatively to the shaft 1 and which bears, by means of a ball-bearing 17, against a sleeve 18, so mounted upon the hub portion 2b of the carrier 2 as to be axially slidable but not rotatable thereon. At the right hand end of this sleeve 18 there are lugs 7a projecting in an axial direction from the pressure plate 7. The lugs 7a engage through corresponding apertures in the web portion 2c of the carrier 2. The sliding of the pressure plate 7 against the action of the springs 6 is effected in a known manner by the aid of a pressure ring 19, actuated by the driver of the vehicle by means of the clutch pedal.

Through gaps in the levers 15 there project plunger-like members 20, which engage, with a ball-shaped head 20a at the right hand end in a corresponding cavity of spherical form in the pressure ring 13. The opposite ends of the members 20 project through holes 11a provided in the flywheel 11 and are provided with a nose 20b which can come into engagement with a projection 21, constructed as a spring stirrup and secured to the flywheel. The plungers 20 are also formed with notches 20c, in which a pawl-like projection 15b, provided in the gap in the lever 15, can engage. The right hand side face of the notch of each of said plungers 20 is inclined.

The method of operation is as follows: In the working position, that is to say, when the clutch is closed, the clutch disks 3, 4 are pressed together by the springs 6 by means of the levers 8. The levers 15 are in the position illustrated in Figure 1. If, in the gear connected by the clutch with the engine, a lower speed for instance is to be put in, the driver, after he has closed the throttle, steps on the clutch pedal, as a result of which first the main clutch is relieved, and immediately thereafter the auxiliary clutch is opened. The levers 15, which then execute a movement towards the left with their lower ends, take the plungers 20 with them by the aid of their pawls 15b, the resilient projection 21 yielding. If the pedal is depressed still further, the plungers, with their noses 20b, jump over the springs 21, and the latter return to the initial position. The levers 15 then go back a little way again, without taking the plungers 20 with them. During the further backward movement, by the inclined surfaces on the right hand side of the notches 20c, the plungers 20 are lifted, as a result of which they become free from the resilient projections 21. The pressure springs 13a can now come into action. They throw the pressure plate 13 against the friction disc 9, whereby the auxiliary clutch is suddenly closed.

The essence of the invention consists therefore in sub-dividing the clutch device into a main or working clutch, and an auxiliary or holding clutch. The latter is preferably constructed as a simple friction disk clutch running dry, which can work with high specific pressures, since, in closing, it merely has to overcome the slight resistances of the still released main clutch during the slipping of the latter, but afterwards remains quite stationary, while the main or working clutch furnishes the slipping work in accelerating a starting vehicle. Since the main clutch is constructed with a large number of disks, and its specific load is therefore very low, and since in addition it can work in an oil bath, or, in the case of larger constructions, with a circulation of cooling fluid passing through an external cooler, it is in a position to furnish the frictional work arising during even a lengthy period of slipping, and above all to permit of a smooth and not jerky starting.

In the construction shown in Figure 2, 1 again denotes the driven shaft, 10 the driving shaft, and 2 the carrier for the inner disks 3, which in this case is mounted fast upon the latter shaft. The carrier 5 for the outer disks 4 is connected fast with a disk 11, with the teeth of which there meshes a pinion on the starting motor of the vehicle. To this disk is also secured, through the medium of an annular body 12, one of the cooperating friction surfaces 12a of the auxiliary clutch, the friction disk 9, 9a of which is connected by its driver 23 with the driven shaft 1 by grooves and ledges in such a manner that the driver can slide axially along the shaft but not rotate relatively thereto. The friction ring 9 engages with radial projections in the spaces between teeth provided on the driver 23. The driver 23 forms at the same time the casing for the entire clutch. The pressure plate 13 of the auxiliary clutch is guided in an axial direction upon the carrier 5, and is provided with a plurality of projections 13b extending radially inwards, which are located within the range of movement of the pressure plate 14 of the main clutch, in such a way that the latter, when it is moved towards the left, in the release of the main clutch, against the action of the springs 6 that press it against the clutch disks 3, 4, takes with it the pressure plate 13 of the auxiliary clutch, as a result of which the latter is likewise released. The release of the main clutch is effected in the usual manner through the medium of a ring 19, surrounding the driven shaft 1, and slidable in an axial direction, coated with graphite. This ring, when the clutch pedal is depressed, is displaced in the direction of the arrow, and then pressed upon the hub portion 23a of the driver 23 for the auxiliary clutch. Between the hub portion of the driver and the levers 8 supported at 8a on an abutment ring 22 connected fast with the carrier 5 is interposed a ball thrust bearing 7, so that upon displacement of the driver 23 in the direction of the arrow the pressure plate 14 is moved towards the left by means of the pull rods 24 connecting it with the short arms of the levers 8, as a result of which the relieving of the clutch disks 3, 4 is effected, and therefore the release of the main clutch. The engagement of the frictional surfaces of the auxiliary clutch is effected by the aid of springs 13a, which are compressed between the pressure plate 13 and outwardly directed projections on the abutment ring 22.

The method of operation is as follows: When the clutch pedal is depressed the clutch disks of the main clutch is relieved, against the action of the springs 6, by the retraction of the pressure plate 14. The disks do not however become free, since the path of the pressure plate is very small in comparison with the large number of disks. If the clutch pedal is pressed right down the pressure plate 14 then strikes against the projections 13b on the pressure plate of the auxiliary clutch and takes the latter with it, as a result of which the auxiliary clutch is also released. Since the latter, as contrasted with the main clutch, only has two friction surfaces, the smallest travel of the pressure plate 13 is sufficient to free the friction surfaces from one another completely. The actuating of the laminated disk clutch is effected in this way as simply as that of an ordinary single-disk clutch.

The friction disk 9 may conveniently be made of sheet steel or of light metal, and coated on both sides with annular disks 9a of special frictional material.

The connecting of the carrier 5 of the outer disks of the main clutch with the toothed wheel 11 for the starter presents the advantage that the latter may under some circumstances be made comparatively thin, because it is directly possible to bring the toothed wheel 11, together with the associated inertia mass, to a relatively high speed, of revolution by the aid of a low-power motor, and thereby to store up energy. Only when this has been done is the clutch allowed to engage, for the energy available for starting is not only that of the rotor of the starting engine, but also that of the toothed wheel 11 acting as a flywheel.

The embodiment illustrated in Figure 3 presents the advantage over those already described, that the displacement travel of the disengagement sleeve requisite for the disengagement of the clutch, and therefore the travel of the clutch pedal, is considerably shortened. This is attained owing to the fact that by omitting the lever transmission between the disengaging sleeve and the pressure plate acting upon the clutch disks, the latter is transferred to the other side of the clutch disks and is so formed that it can be lifted by direct displacement by disengaging the muff 19 from the clutch disks. The auxiliary clutch may still be actuated by the aid of levers as before. These may bear with their inner ends directly on the pressure plate of the main clutch.

In Figure 3, the engine shaft is again denoted by 10, and the driven shaft by 1. To the flywheel 11, flanged to the shaft 10 is secured at 11a a pot-shaped casing 35, with the right hand flange member 35a of which a sleeve 2, concentric with the shaft, is connected by screws 2a. The sleeve 2 serves as a carrier for the group of disks 3 pertaining to the shaft 10. The disks 4, of the group belonging to the shaft 1, are aligned upon bolts 5b, which are screwed into a ring body 5, which forms the carrier for the group of disks 4. The bolts 5b at the same time hold an annular disk 5c, which serves as an abutment for the compression of the clutch disks 3, 4. This compression is effected by the aid of a pressure plate 14, which is displaceable in an axial direction, with a hub body 14a, constructed as a hollow sleeve, upon a hub sleeve 30a. To the sleeve 30a, which is supported by the aid of ball bearings 28, 29 upon the driven shaft 1, is attached a disk 30, which is integral with the ring body 5. The ring body 5 forms, towards the flywheel 11, a bell-shaped extension 23, which, on the side facing the flywheel, presents an inwardly projecting ring 12. The latter serves as an abutment for the friction disk 9 of the auxiliary clutch. The pressure plate 13 of the auxiliary clutch forms a ring, which is guided on ledges 23a on the body 23, and which is pressed against the friction disk 9 by helical springs 13a located between it and the flange member of the bell body 23. The releasing of the auxiliary clutch is effected by the aid of levers 15, which are distributed round the periphery, and which are supported at 15a on the annular body 5. These levers bear with their lower ends on the pressure plate 14 of the main clutch, and with their shorter upper ends on positioning screws 25 of the pressure ring 13 of the auxiliary clutch.

The friction disk 9 of the auxiliary clutch consists of a disk of thin spring sheet metal, which, on the inside, in the neighbourhood of the axis, is riveted to the flange 26 of a sleeve 27 keyed on to the shaft 1, while on the outer margin it carries the two coatings 9a of special frictional material, for instance a mass of asbestos fibre bound together with an artificial resin, co-operating with the abutment 12 and the friction ring 13. The sheet metal disk 9 is given a certain initial stress when inserted, in such a way that the external surfaces of the coverings 9a, when the auxiliary clutch is released, are located very close to the abutment 12 and also to the pressure ring 13. In this way any dragging of the auxiliary clutch in a disengaged condition is obviated.

The pressing together of the clutch disks of the main clutch is effected by the aid of a strong helical spring 6, which is lodged, concentrically with the axis of the shaft, in the annular cavity in the hub sleeve 14a, and bears at one end against the bottom of this cavity, and at the other end against the disk 30. The opening of the main clutch is effected when the clutch pedal acting upon the disengaging muff 19 is depressed, by the direct action of the disengaging muff upon the opposite end of the hub sleeve 14a, and therefore, through the medium of this hub sleeve, upon the pressure plate 14. By the latter the levers 15 of the auxiliary clutch are moved at the same time, whereby also this clutch is released.

The method of operation is as follows:—

When the clutch is to be released, the muff 19 is displaced in the direction of the arrow by depressing the pedal. It then comes into direct contact with the hub body 14a of the pressure plate 14, and lifts the latter off the clutch disks of the main clutch against the action of the spring 6, so that the main clutch becomes free. At the same time, through the medium of the levers 15, the pressure ring 13 of the auxiliary clutch is moved to the right, as a result of which the latter becomes free. Upon release of the clutch pedal the parts go back under the action of the clutch springs into the position illustrated in the drawings, in which both clutches are closed.

I claim:

1. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, both of said carriers being substantially non-shiftable in an axial direction, an auxiliary friction clutch between said loosely rotatable carrier and the rotatable member with which it is arranged to coact and clutch actuating means for said main and auxiliary clutches arranged to open the main clutch before the auxiliary clutch and to close the main clutch after the auxiliary clutch.

2. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, an auxiliary friction clutch between said loosely rotatable carrier and the rotatable member with which it is arranged to coact and spring means for automatically closing said main clutch, separate spring means for automatically closing said auxiliary clutch and common clutch operating means for relieving the main and auxiliary clutches from the action of the said spring means.

3. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, an auxiliary friction clutch between said loosely rotatable carrier and the rotatable member with which it is arranged to coact and spring means for automatically closing said main clutch, separate spring means for automatically closing said auxiliary clutch and common clutch operating means for relieving the main and auxiliary clutches from the action of the said spring means, said common clutch operating means being arranged to relieve the main clutch before relieving the auxiliary clutch.

4. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, an auxiliary friction clutch between said loosely rotatable carrier and the rotatable member with which it is arranged to coact and spring means for automatically closing said main clutch, separate spring means for automatically closing said auxiliary clutch, clutch operating means for relieving the main clutch from the action of the spring means for closing it and clutch operating means for relieving the auxiliary clutch from the action of the spring means for closing it, arranged for actuation by the operating means for relieving the main clutch and in lost motion relationship with respect thereto.

5. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, an auxiliary friction clutch of the single disk type comprising a pressure ring and located between said second mentioned carrier and the rotatable member with which it coacts, spring means for closing the main clutch, spring means for closing the auxiliary clutch, clutch operating means for relieving the main clutch from the action of the spring means for closing it and clutch operating means for relieving the auxiliary clutch from the action of the spring means for closing it and comprising a plurality of double-armed levers pivotally mounted on the second mentioned carrier and arranged to engage said pressure ring.

6. In a clutch mechanism, the combination as set forth in claim 5 with adjustable screw means between the levers and the pressure ring for adjustably transmitting the motion of the levers to the pressure ring.

7. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, both of said carriers being substantially non-shiftable in an axial direction, an auxiliary friction clutch between said loosely rotatable carrier and the rotatable member with which it is arranged to coact, said auxiliary clutch comprising a friction disk, two abutments rigid with the second-mentioned carrier, a pressure ring located between said friction disk and one of said abutments, pressure springs for closing the auxiliary clutch located between the pressure ring and the said abutment, spring means for closing the main clutch, an axially shiftable member arranged so as to be capable of relieving the main clutch from the action of said spring means and means arranged to co-operate with said axially shiftable member for relieving the pressure ring from the action of the pressure springs.

8. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, both of said carriers being substantially non-shiftable in an axial direction, an auxiliary friction clutch between said loosely rotatable carrier and the rotatable member with which it is arranged to coact, said auxiliary clutch comprising a friction disk, two abutments rigid with the second-mentioned carrier, a pressure ring located between said friction disk and one of said abutments, pressure springs for closing the auxiliary clutch located between the pressure ring and the said abutment, spring means for closing the main clutch, an axially shiftable member arranged so as to be capable of relieving the main clutch from the action of said spring means and double-armed levers pivotally mounted on the second-mentioned carrier, arranged to engage said pressure ring and to co-operate with the axially shiftable member for relieving the pressure ring from the action of the pressure springs.

9. In a clutch mechanism especially for automobile vehicles having toothed-wheel change-speed gearing, the combination of a rotatable driving member and a rotatable driven shaft with a main clutch of the multiple disk type, comprising two sets of co-operating clutch disks, a carrier for one of said sets of clutch disks rigidly connected to said driving member, a carrier for the other set of clutch disks loosely rotatable with respect to said driving member and driven shaft, an auxiliary friction clutch located between said second-mentioned carrier and the driven shaft, an annular pressure member between said driving member and said sets of clutch disks, spring means for closing said main clutch interposed between said pressure member and the second-mentioned carrier so as to apply the pressure member to the sets of clutch disks, means for displacing the pressure member so as to compress said closing springs and relieve the clutch disks from the action of the pressure member and means arranged to co-operate with said pressure member for operating the auxiliary friction clutch.

10. In a clutch mechanism especially for automobile vehicles having toothed-wheel change-speed gearing, the combination of a rotatable driving member and a rotatable driven shaft with a main clutch of the multiple disk type, comprising two sets of co-operating clutch disks, a carrier for one of said sets of clutch disks rigidly connected to said driving member, a carrier for the other set of clutch disks loosely rotatable with respect to said driving member and driven shaft, an auxiliary friction clutch located between said second mentioned carrier and the driven shaft, an annular pressure member between said driving member and said sets of clutch disks, spring means for closing said main clutch interposed between said pressure member and the second-mentioned carrier so as to apply the pressure member to the sets of clutch disks, said auxiliary friction clutch comprising a friction disk, an abutment for said friction disk on the second-mentioned carrier, a pressure ring, closing springs arranged to bear against said pressure ring so as to apply the pressure ring against said friction disk, and radial double-armed levers pivotally mounted on the second-mentioned carrier with their outer arms in engagement with the pressure ring and their inner arms in engagement with the annular pressure member.

11. In a clutch mechanism, the combination as set forth in claim 10 with a hollow hub member rigidly connected to the annular pressure member and containing the spring means for closing the main clutch and an axially shiftable operating member for displacing said hub member axially relatively to said driven shaft.

12. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, both of said carriers being substantially non-shiftable in an axial direction, an auxiliary friction clutch of the single disk type between said loosely rotatable carrier and the rotatable member with which it is arranged to coact, spring means for closing the main clutch, an annular pressure member interposed between said spring means and the main clutch, an axially shiftable operating member for relieving the main clutch from the action of the clutch closing springs, said operating member being mounted non-rotatably relatively to the loosely rotatable carrier, an axially shiftable non-rotatable operating member arranged so as to be capable of being brought into engagement with the operating member for relieving the main clutch from the action of the closing springs therefor and operating means for opening and closing the auxiliary clutch.

13. In a clutch mechanism especially for automobile vehicles having toothed-wheel change-speed gearing, the combination of a rotatable driving member and a rotatable driven member with a main clutch of the multiple disk type, comprising two sets of cooperating clutch disks, an inner carrier for one of said sets of clutch disks, rigid means for connecting said inner carrier to one of said rotatable members, an outer carrier for the other set of clutch disks arranged to coact with the other rotatable member and loosely rotatable with respect to both the rotatable members, an auxiliary friction clutch between said loosely rotatable carrier and the rotatable member with which it is arranged to coact, said rigid connecting means enclosing said outer carrier, and clutch actuating means for said main and auxiliary clutches arranged to open the main clutch before the auxiliary clutch and to close the main clutch after the auxiliary clutch.

14. In a clutch mechanism especially for automobile vehicles having toothed-wheel change-speed gearing, the combination of a rotatable driving member and a rotatable driven member with a main clutch of the multiple disk type, comprising two sets of co-operating clutch disks, an inner carrier for one of said sets of clutch disks, rigid means for connecting said inner carrier to one of said rotatable members, an outer carrier for the other set of clutch disks arranged to coact with the other rotatable member and loosely rotatable with respect to both the rotatable members, an auxiliary friction clutch between said loosely rotatable carrier and the rotatable member with which it is arranged to coact, said rigid connecting means enclosing said outer carrier and said auxiliary clutch, and clutch actuating means for said main and auxiliary clutches arranged to open the main clutch before the auxiliary clutch and to close the main clutch after the auxiliary clutch.

15. In a clutch mechanism especially for automobile vehicles having toothed-wheel change-speed gearing, the combination of a rotatable driving member and a rotatable driven member with a main clutch of the multiple disk type, comprising two sets of co-operating clutch disks, an inner carrier for one of said sets of clutch disks, rigid means for connecting said inner carrier to one of said rotatable members, an outer carrier for the other set of clutch disks arranged to coact with the other rotatable member and loosely rotatable with respect to both the rotatable members, an auxiliary friction clutch between said loosely rotatable carrier and the rotatable member with which it is arranged to coact, spring means for closing the main clutch, and clutch operating means for relieving the main clutch from the action of said spring means, said clutch operating means comprising a plurality of levers pivotally mounted on said outer carrier on that side of the sets of clutch disks which faces away from said clutch operating means.

16. In a clutch mechanism especially for automobile vehicles having toothed-wheel changed-speed gearing, the combination of a rotatable driving member and a rotatable driven member with a main clutch of the multiple disk type, comprising two sets of co-operating clutch disks, an inner carrier for one of said sets of clutch disks, rigid means for connecting said inner carrier to one of said rotatable members, an outer carrier for the other set of clutch disks arranged to coact with the other rotatable member and loosely rotatable with respect to both the rotatable members, an auxiliary friction clutch between said loosely rotatable carrier and the rotatable member with which it is arranged to coact, said rigid connecting means enclosing said outer carrier and said auxiliary clutch, spring means for closing the main clutch, and clutch operating means for relieving the main clutch from the action of said spring means, said clutch operating means comprising a plurality of radially extending double-armed levers pivotally mounted on said outer carrier on that side of the sets of clutch disks which faces away from said clutch operating means.

17. In a clutch mechanism as claimed in claim 16, said auxiliary clutch comprising a pressure ring, the outer arms of said radially extending levers being adapted to engage said pressure ring while the inner arms being adapted to be engaged by said clutch actuating means.

18. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, an auxiliary friction clutch between said loosely rotatable carrier and the rotatable member with which it is arranged to coact, means for actuating said auxiliary clutch, and means for actuating said main clutch independently of said auxiliary clutch actuating means, so as to open the main clutch each time before the auxiliary clutch is opened, but to close the main clutch after the auxiliary clutch is closed.

19. A clutch mechanism as claimed in claim 16, the auxiliary clutch of which comprises a pressure ring and a friction disk, characterized by the feature that the levers of the auxiliary clutch engage by their outer ends on the inside of said pressure ring of the auxiliary clutch, which is pressed against said friction disk by means of springs provided between it and said outer carrier, while the inner ends of the levers lie opposite a hub member which is in engagement with said clutch operating means.

20. A clutch mechanism as claimed in claim 1, the auxiliary clutch of which comprises a pressure ring, an abutment and a plurality of springs interposed between said abutment and said pressure ring, characterized by the feature that the loosely rotatable clutch disk carrier together with said abutment which is rigid with it forms an annular body substantially U-shaped in cross-section.

21. In a clutch mechanism especially for automobile vehicles having toothed-wheel change-speed gearing, the combination of a rotatable driving member and a rotatable driven member with a main clutch of the multiple disk type, comprising two sets of co-operating clutch disks, a carrier for one of said sets of clutch disks fixed to one of said rotatable members, a carrier for the other set of clutch disks arranged to coact with the other rotatable member and loosely rotatable with respect to both the rotatable members, an auxiliary friction clutch between said loosely rotatable carrier and the rotatable member with which it is arranged to coact, clutch actuating means for said main and auxiliary clutches arranged to open the main clutch before the auxiliary clutch and to close the main clutch after the auxiliary clutch, said clutch actuating means comprising a non-rotatable ring member, a sleeve member having an annular end surface and being adapted to rotate together with said loosely rotatable clutch disk carrier, and means to cause said ring member to come into frictional engagement with the annular face of said sleeve member.

HANS KATTWINKEL.